United States Patent
Georgis et al.

(10) Patent No.: US 8,792,387 B2
(45) Date of Patent: Jul. 29, 2014

(54) SYSTEM AND METHOD FOR EFFECTIVELY POPULATING A MESH NETWORK MODEL

(75) Inventors: Nikolaos Georgis, San Diego, CA (US); Yi Zhou, San Diego, CA (US); Fredrik Carpio, San Diego, CA (US)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 12/381,196

(22) Filed: Mar. 9, 2009

(65) Prior Publication Data

US 2010/0226279 A1   Sep. 9, 2010

(51) Int. Cl.

| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 64/00 | (2009.01) |
| H04W 84/12 | (2009.01) |
| H04W 8/00 | (2009.01) |

(52) U.S. Cl.
CPC .............. *H04W 64/00* (2013.01); *H04W 84/12* (2013.01); *H04W 8/005* (2013.01)
USPC ............................ 370/255; 370/328; 370/406

(58) Field of Classification Search
CPC ...... H04L 12/28; H04W 8/005; H04W 24/00; H04W 64/00
USPC ......... 370/230, 236, 254, 255, 328, 332, 396, 370/400, 406
See application file for complete search history.

(56) References Cited

U.S. PATENT DOCUMENTS

| | | | | |
|---|---|---|---|---|
| 7,123,925 | B2 * | 10/2006 | Robinson et al. | 455/456.1 |
| 7,319,878 | B2 * | 1/2008 | Sheynblat et al. | 455/456.3 |
| 7,509,093 | B2 * | 3/2009 | Persson et al. | 455/41.2 |
| 7,664,054 | B2 * | 2/2010 | Adya et al. | 370/255 |
| 7,706,369 | B2 * | 4/2010 | Roese et al. | 370/389 |
| 2002/0080759 | A1 * | 6/2002 | Harrington et al. | 370/338 |
| 2006/0121914 | A1 * | 6/2006 | Kim et al. | 455/456.1 |

(Continued)

FOREIGN PATENT DOCUMENTS

| | | |
|---|---|---|
| JP | 2006-003187 A | 1/2006 |
| WO | WO 00/50919 A2 | 8/2000 |
| WO | WO 2006/099598 A2 | 9/2006 |
| WO | WO 2009069881 A1 * | 6/2009 |

OTHER PUBLICATIONS

Constraining probabilistic relaxation with symbolic attributes. Mohamad Hatef and Josef Kittler; Computer Analysis of Images and Patterns Lecture Notes in Computer Science, 1995, vol. 970/1995, 862-867, DOI: 10.1007/3-540-60268-2_394.*

(Continued)

*Primary Examiner* — Benjamin H Elliott, IV
(74) *Attorney, Agent, or Firm* — Sony Corporation

(57) ABSTRACT

A system and method for populating a mesh network model includes peer devices that are configured to transmit peer device signals by utilizing a wireless broadcasting procedure. Mobile devices wirelessly detect the peer device signals to produce wireless scan data corresponding to the peer devices. A location server may then receive the wireless scan data for performing a location estimation calculation procedure with the wireless scan data to thereby determine location coordinates for effectively populating the mesh network model.

22 Claims, 11 Drawing Sheets

(56) References Cited

U.S. PATENT DOCUMENTS

| | | | |
|---|---|---|---|
| 2006/0212278 A1* | 9/2006 | Hirai | 703/2 |
| 2007/0060098 A1* | 3/2007 | McCoy | 455/404.2 |
| 2007/0232347 A1* | 10/2007 | Persson et al. | 455/550.1 |
| 2008/0032705 A1* | 2/2008 | Patel et al. | 455/456.1 |
| 2008/0076450 A1* | 3/2008 | Nanda et al. | 455/456.1 |
| 2008/0155094 A1 | 6/2008 | Roese et al. | |
| 2008/0225779 A1* | 9/2008 | Bragiel et al. | 370/328 |
| 2008/0227470 A1 | 9/2008 | Tien | |
| 2008/0242310 A1* | 10/2008 | Vassilovski | 455/456.1 |
| 2010/0135168 A1* | 6/2010 | Chen et al. | 370/252 |
| 2010/0159958 A1* | 6/2010 | Naguib et al. | 455/457 |
| 2010/0164720 A1* | 7/2010 | Kore | 340/541 |
| 2010/0222053 A1* | 9/2010 | GiriSrinivasaRao et al. | 455/432.1 |
| 2010/0226279 A1* | 9/2010 | Georgis et al. | 370/254 |
| 2010/0265092 A1* | 10/2010 | Kim et al. | 340/825.49 |

OTHER PUBLICATIONS

Toks Adebutu Lionel Sacks, Ian Marshall, Simple Position Estimation for Wireless Sensor Networks, 2003, http://www.ee.ucl.ac.uk/lcs/papers2003/121.pdf, Electrical and Electronic Engineering, University College London, BTexact Technologies, pp. 1-4.

Kitasuka, T., Nakanishi, T., Fukuda, A., Location Estimation System Using Wireless Ad-Hoc Network, http://ieeexplore.ieee.org/xpls/abs_all.jsp?arnumber=1088182, Graduate Sch. of Inf.Sci & Electr. Eng . . . , Kyushu Univ., Japan; Oct. 27-30, 2002, p. 1.

Pratik Biswas, Yinyu Ye, Semidefinite Programming for Ad Hoc Wireless Sensor Network Localization, http://www.stanford.edu/~yyye/adhocn4.pdf, Dept. of Electr. Eng., Stanford Uni., CA, USA, Apr. 26-27, 2004, pp. 1-5.

Doherty, L., Pister, K.S.J., El Ghaoui, L., Convex Position Estimation in Wireless Sensor Networks, http://ieeexplore.ieee.org/xpls/abs_all.jsp?arnumber=916662, Dept. of Electr.Eng. & Comput. Sci., California Univ., Berkeley, CA, 2001, pp. 1-2.

* cited by examiner

SYSTEM AND METHOD FOR EFFECTIVELY POPULATING A MESH NETWORK MODEL

BACKGROUND SECTION

1. Field of the Invention

This invention relates generally to techniques for utilizing mobile electronic devices, and relates more particularly to a system and method for effectively populating a mesh network model.

2. Description of the Background Art

Implementing effective methods for utilizing mobile electronic devices is a significant consideration for designers and manufacturers of contemporary electronic devices. However, effectively implementing mobile devices may create substantial challenges for system designers. For example, enhanced demands for increased system functionality and performance may require more device processing power and require additional device resources. An increase in processing or device requirements may also result in a corresponding detrimental economic impact due to increased production costs and operational inefficiencies.

Furthermore, enhanced device capability to perform various advanced operations may provide additional benefits to a device user, but may also place increased demands on the control and management of various device components. For example, implementing an enhanced electronic device that effectively provides accurate device-location information to a device user may present certain difficulties because of the unpredictable operating environments that may potentially be encountered.

Due to growing demands on system resources and the significant difficulty in predicting the varying device operating conditions and environments, it is apparent that developing new techniques for implementing and utilizing mobile electronic devices is a matter of concern for related electronic technologies. Therefore, for all the foregoing reasons, developing effective systems for implementing and utilizing mobile electronic devices remains a significant consideration for designers, manufacturers, and users of contemporary electronic devices.

SUMMARY

In accordance with the present invention, a system and method are disclosed for effectively populating a mesh network model. In accordance with one embodiment of the present invention, one or more mobile devices in an electronic network perform a wireless scanning procedure by utilizing any effective techniques to detect transmission signals from other peer mobile devices or other appropriate entities in the electronic network. The mobile device(s) measure and store wireless scan data corresponding to the wireless scanning procedure. The wireless scan data may include any appropriate information including, but not limited to, device identifiers and signal strengths for the respective scanned peer devices.

In certain embodiments, the mobile device(s) send the captured wireless scan data to a location server by utilizing any effective transmission techniques. A device location calculator of the location server may utilize predefined threshold criteria to determine whether sufficient wireless scan data exists for successfully performing a location estimation calculation procedure to determine location coordinates for one or more entities in the electronic network.

If sufficient wireless scan data has been collected, then the device location calculator of the location server analyzes the wireless scan data to perform the location estimation calculation procedure to determine location coordinates for entities in the electronic network. The device location calculator may perform the location estimation calculation procedure by utilizing any effective calculation or estimation techniques. For example, the device location calculator may utilize various known or enhanced triangulation techniques to estimate the locations of appropriate network entities. Alternately, the device location calculator may utilize various known or enhanced probabilistic relaxation techniques to estimate the locations of appropriate network entities. In addition, the locations of certain network entities may be directly measured or are already known.

The device location calculator may then utilize the estimated location coordinates from the location estimation calculation procedure, along with any measured or known location coordinates, to populate or update the mesh network model. The location server may then provide the mesh network model to the mobile devices by utilizing any appropriate and effective communication techniques. Finally, the mobile devices may advantageously utilize the mesh network model to effectively perform any desired device location procedures. For at least the foregoing reasons, the present invention thus provides an improved system and method for effectively populating a mesh network model.

DETAILED DESCRIPTION

The present invention relates to an improvement in the effective utilization of mobile electronic devices. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for populating a mesh network model, and includes peer devices that are configured to transmit peer device signals by utilizing a wireless broadcasting procedure. Mobile devices wirelessly detect the peer device signals to produce wireless scan data corresponding to the peer devices. A location server may then receive the wireless scan data for performing a location estimation calculation procedure with the wireless scan data to thereby determine location coordinates for effectively populating the mesh network model.

Figure 1A:
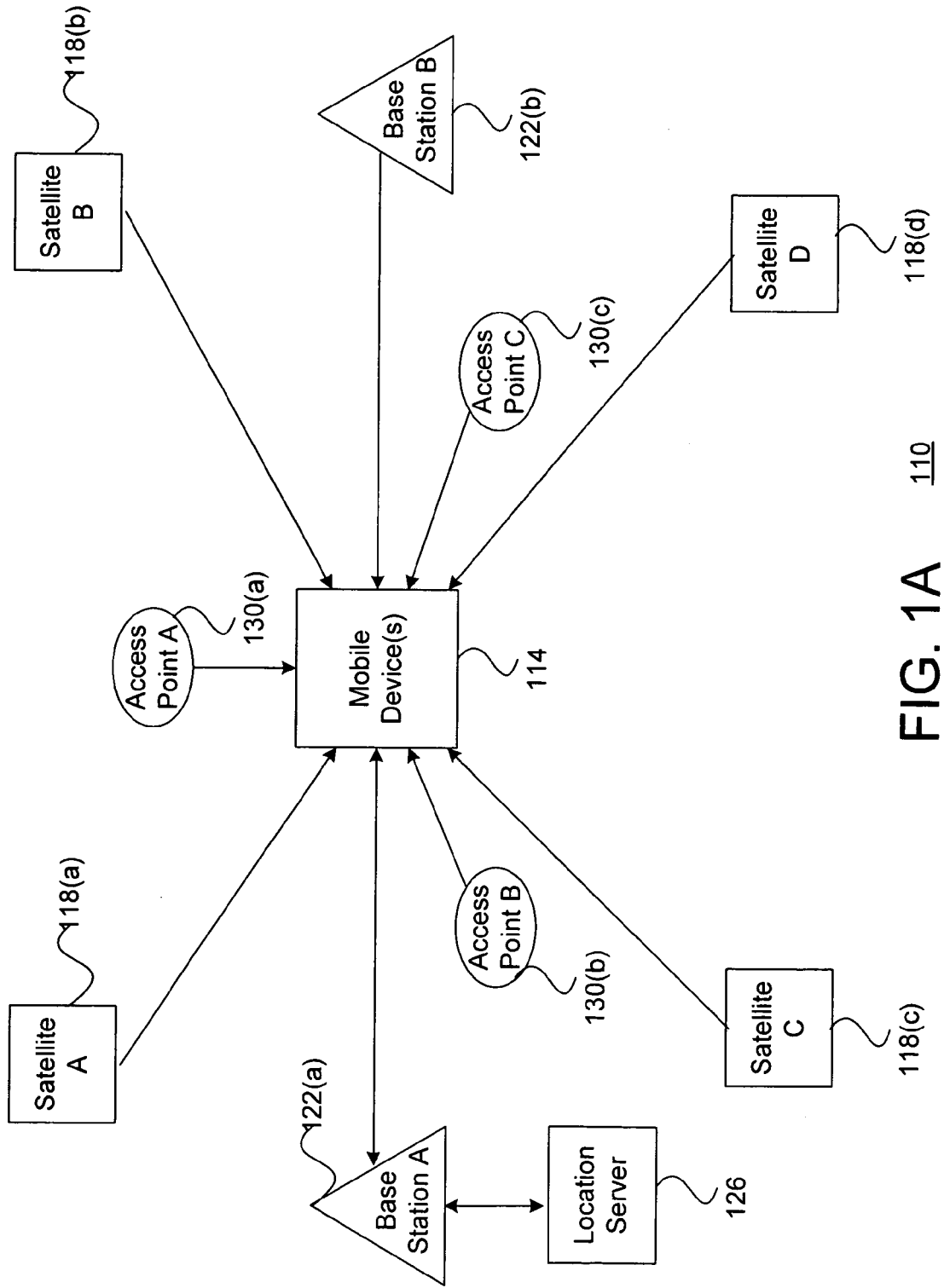
FIG. 1A is a block diagram of an electronic system, in accordance with one embodiment of the present invention.

Referring now to FIG. 1A, a block diagram of an electronic system 110 is shown, in accordance with one embodiment of the present invention. In the FIG. 1A embodiment, electronic system 110 may include, but is not limited to, one or more mobile device(s) 114, a plurality of satellites 118, a plurality of base stations 122, a location server 126, and a plurality of access points 130. In alternate embodiments, electronic system 110 may be implemented using various components and configurations in addition to, or instead of, those components and configurations discussed in conjunction with the FIG. 1A embodiment.

For purposes of illustration, the FIG. 1A embodiment is implemented with one or more mobile device(s) 114, four satellites 118, two base stations 122, one location server 126, and three access points 130. However, in various other embodiments, electronic network 110 may be implemented to include any desired number of the mobile devices 114, satellites 118, base stations 122, location servers 126, and access points 130.

In the FIG. 1A embodiment, mobile device(s) 114 may be implemented as any type of electronic device for which a current physical location may be determined and conveyed to a device user or other appropriate entity. For example, in certain embodiments, mobile devices 114 may include, but are not limited to, a laptop computer device, a personal digital assistant (PDA), or a cellular telephone. Additional details regarding the implementation and utilization of mobile device 114 are further discussed below in conjunction with FIGS. 3-4.

In the FIG. 1A embodiment, satellites 130 include, but are not limited to, a satellite A 118(a), a satellite B 118(b), a satellite C 118(c), and a satellite D 118(d) that are implemented by utilizing any appropriate technologies to perform any desired functions or operations. For example, in certain embodiments, satellites 118 may be implemented as part of a known or enhanced global positioning system (GPS). In the FIG. 1A embodiment, satellites 118 typically transmit respective satellite beacon signals that mobile devices 114 may receive and analyze using known location calculation procedures (such as trilateralization and/or triangulation) to potentially determine current physical locations (such as longitude, latitude, and altitude information) for mobile devices 114.

However, in certain situations, mobile devices 114 may be unable to receive satellite beacon signals from a sufficient number of the satellites 130 to successfully perform the location calculation procedures. For example, mobile devices 114 may be inside a building or other structure that prevents some or all of the satellite beacon signals from reaching mobile devices 114. Or one or more of the satellite beacon signals may have insufficient signal quality characteristics. To provide additional signal sources from locations other than satellites 130, the FIG. 1A embodiment may include a base station A 122(a) and a base station B 122(b) that are both implemented as terrestrial devices that transmit pilot signals that may be received by mobile devices 114. As with the foregoing satellite beacon signals, mobile devices 114 may analyze the pilot signals from base stations 122 using similar location calculation procedures potentially determine the current physical locations of mobile devices 114.

In the FIG. 1A embodiment, base stations 122 may be implemented by utilizing any appropriate technologies to perform any desired functions or operations. For example, in certain embodiments, base stations 122 may be implemented as part of a known or enhanced wireless wide-area network (WWAN) system by utilizing any appropriate technologies. Furthermore, in certain embodiments, satellites 118 and base stations 122 may be implemented as part of a known or enhanced assisted global-positioning system (AGPS) network. In certain embodiments, electronic network 110 may also include a location server 126 that mobile devices 114 utilize to perform various types of calculations or processing functions to thereby conserve processing resources for mobile devices 114.

However, in certain operating environments, mobile devices 114 may still be unable to receive a satisfactory combination of satellite beacon signals from the satellites 130 and pilot signals from the base stations 122 to successfully perform the location calculation procedures to accurately locate mobile device 114. For example, mobile devices 114 may be inside a concrete parking structure or a shopping mall that prevents some or all of the satellite beacon signals and pilot signals from reaching mobile device 114. Or one or more of the satellite beacon signals or base station pilot signals may have insufficient signal quality characteristics (signal strength, signal-to-noise ratios, etc.).

In the FIG. 1A embodiment, in order to provide additional beacon signals from signal sources other than satellites 130 and base stations 122, the FIG. 1A embodiment advantageously includes access points 130 that are implemented as terrestrial devices that transmit access-point beacon signals to mobile devices 114. As with the previously-discussed satellite beacon signals and pilot signals, mobile devices 114 may also analyze the access-point beacon signals using similar location calculation procedures to more accurately and effectively determine the current physical location of mobile devices 114.

In the FIG. 1A embodiment, access points 130 include, but are not limited to, an access point A 130(a), an access point B 130(b), and an access point C 130(c) that may be implemented by utilizing any appropriate technologies to perform any desired functions or operations. For example, in certain embodiments, access points 130 may be implemented as part of a known or enhanced wireless local-area network (WLAN) system using any appropriate technologies. In certain embodiments, access points 130 may be implemented according to WLAN standards that include, but are not limited to, any of the known 802.11 WLAN standards (such as 802.11a. 802.11b, 802.11g, and 802.11n).

In certain embodiments in which access points 130 are implemented as publicly-deployed WiFi "hotspots" or other similar WLAN nodes/systems, the widespread presence of such WLAN networks provides a ready availability of pre-existing potential access points 130 at many public locations. In order to successfully utilize access points 130 to accurately locate mobile devices 114, an access point database is typically utilized to specifically indicate physical coordinates for each access point 130.

Because access points 130 have easily changeable locations, and because access points 130 may be added or removed at any time, one traditional method of populating and maintaining a access point database is to employ one or more individuals to drive around an area with a WiFi scanner device to measure and physically locate any available access points 130. This process is time-consuming and expensive. In addition, any resulting access point database may be inaccurate because of changes that have occurred since the last scanning process. Furthermore, in certain situations, the access points may simply be out of range for successful wireless communications with respect to one or more mobile devices 114 that seek to utilize the access points to determine physical locations of the mobile devices 114.

The present invention therefore proposes to advantageously utilize wireless functionality of the mobile devices 114 to scan or otherwise communicate with one or more peer mobile devices 114 whose location is known. The resultant mobile device scan data may then be utilized to gradually create a mesh network model that represents the electronic network 110. In certain situations, a sequential device location procedure may be performed to sequentially locate a series of intervening peer mobile devices 114 between a subject mobile device 114 and a target mobile device 114 for which a specific physical location is known. In certain embodiments, the mobile devices 114 may automatically transmit the scanned mobile device measurement data to location server 126 or another appropriate entity for populating and updating the mesh network model. Additional details regarding the creation of a mesh network model are further discussed below in conjunction with FIGS. 3-9B.

Figure 1B:
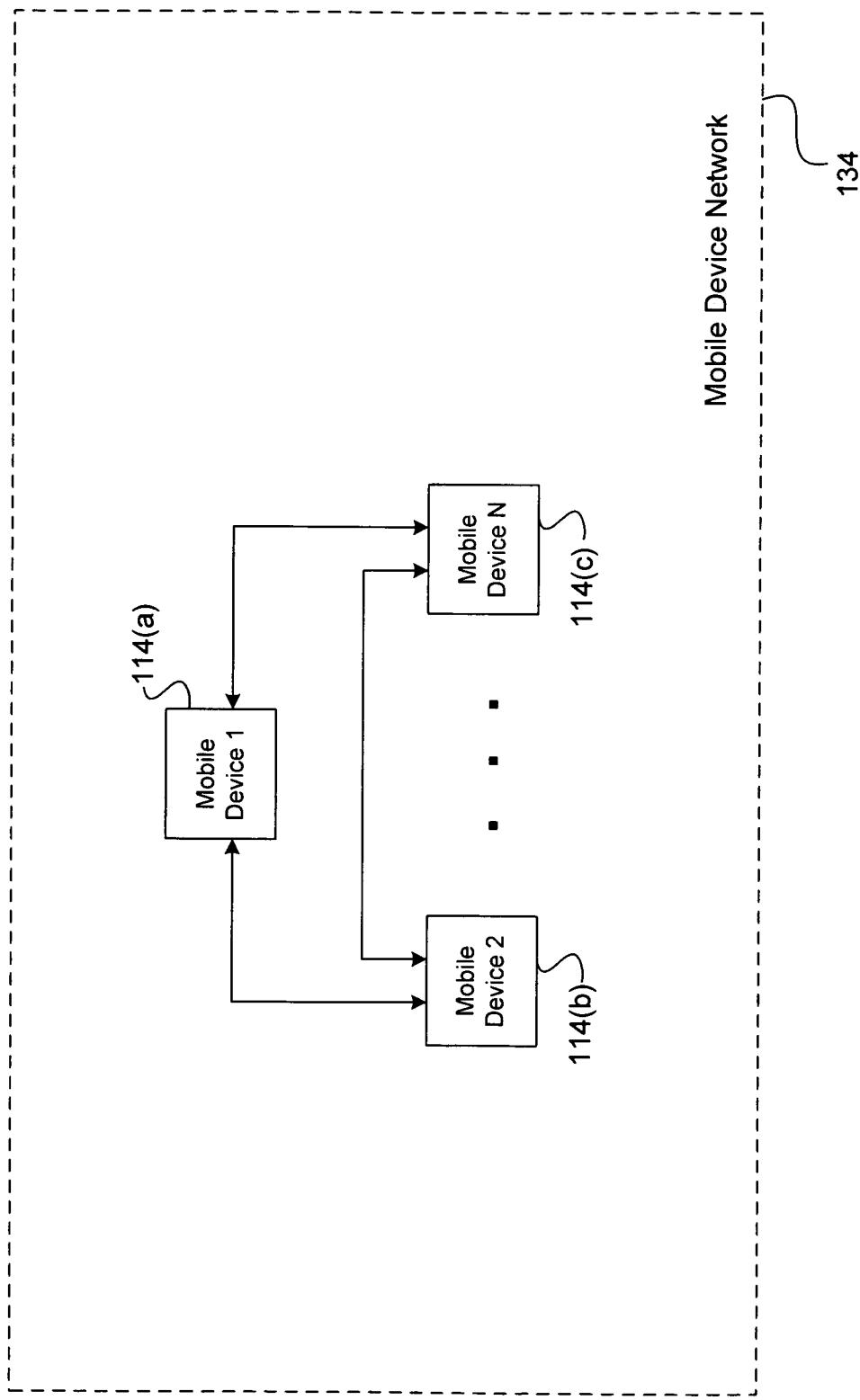
FIG. 1B is a block diagram of the mobile devices of FIG. 1A, in accordance with one embodiment of the present invention.

Referring now to FIG. 1B, a block diagram of the FIG. 1A mobile devices 114 is shown, in accordance with one embodiment of the present invention. The FIG. 1B embodiment includes a mobile device 1 (114(a)), a mobile device 2 (114(b)), through a mobile device N (114(c)) in a mobile device network 134. In alternate embodiments, mobile device network 134 may be implemented by utilizing components and configurations in addition to, or instead of, certain of those components and configurations discussed in conjunction with the FIG. 1B embodiment. Furthermore, mobile device networks 134 may be implemented to include any desired number of individual devices.

In the FIG. 1B embodiment, each of the mobile devices 114 may bi-directionally communicate directly with any other of the mobile devices 114 by utilizing any desired wireless communication techniques or other effective communication methods. For example, mobile device 1 (114(a)) may bi-directionally communicate directly with either mobile device 2 (114(b)) or mobile device N (114(c)). Similarly, mobile device 2 (114(b) may bi-directionally communicate directly with mobile device N (114(c)). Additional details regarding the utilization of the FIG. 1B mobile devices 114 are further discussed below in conjunction with FIGS. 4-9B.

Figure 2:
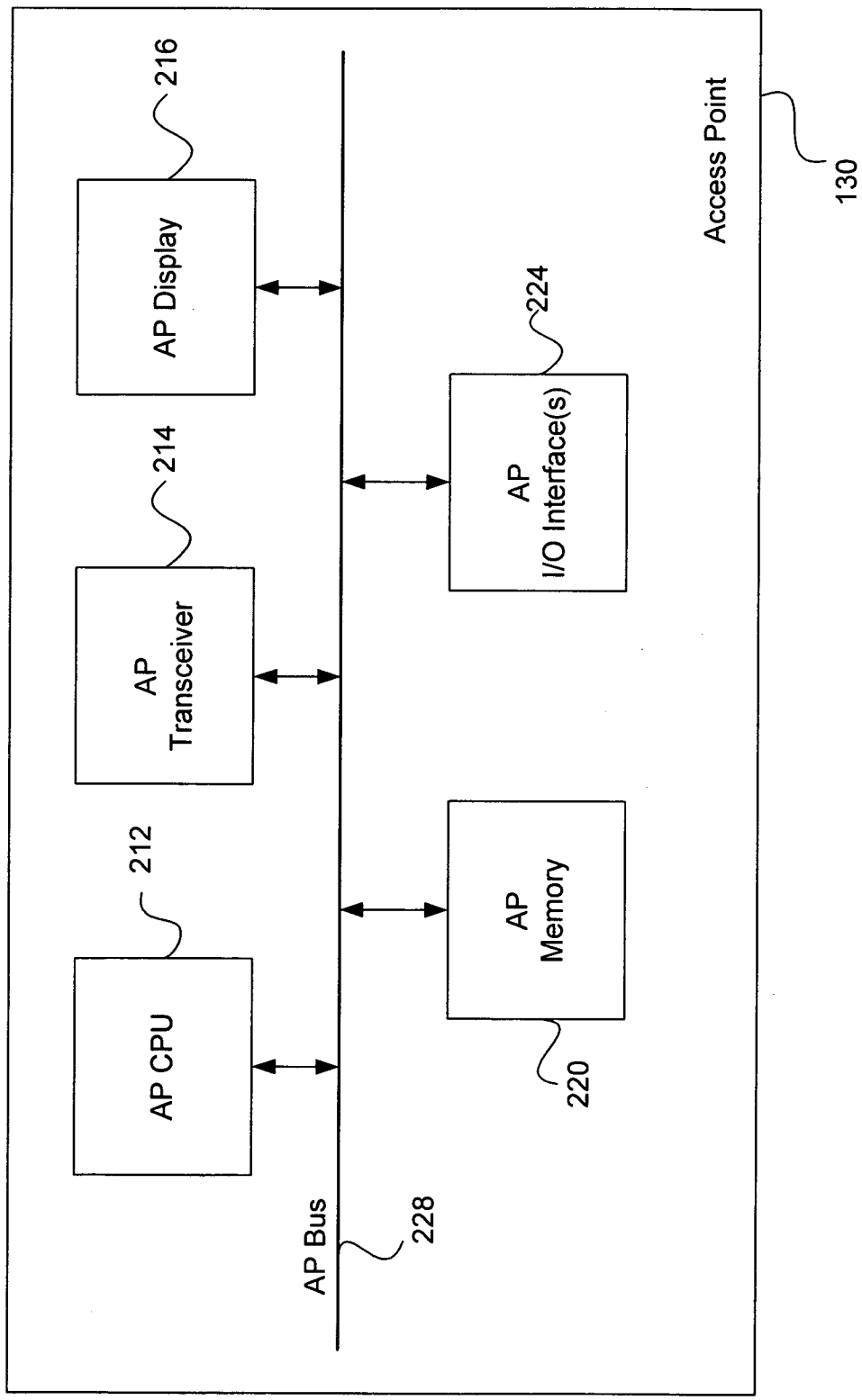
FIG. 2 is a block diagram for one embodiment of an access point of FIG. 1A, in accordance with the present invention.

Referring now to FIG. 2, a block diagram for one embodiment of a FIG. 1A access point 130 is shown, in accordance with the present invention. In the FIG. 2 embodiment, access point 130 may include, but is not limited to, an AP central processing unit (CPU) 212, an AP transceiver 214, an AP display 216, an AP memory 220, and one or more AP input/output interfaces (I/O interfaces) 224. Selected ones of the foregoing components of access point 130 may be coupled to, and communicate through, an AP bus 228. In alternate embodiments, access point 130 may be implemented using various components and configurations in addition to, or instead of, certain of components and configurations discussed in conjunction with the FIG. 2 embodiment.

In the FIG. 2 embodiment, AP CPU 212 may be implemented to include any appropriate and compatible microprocessor device that preferably executes software instructions to thereby control and manage the operation of access point 130. In the FIG. 2 embodiment, AP memory 220 may be implemented to include any combination of desired storage devices, including, but not limited to, read-only memory (ROM), random-access memory (RAM), and various types of non-volatile memory, such as floppy disks, flash memory, or hard disks. In the FIG. 2 embodiment, AP I/O interfaces 224 may preferably include one or more input and/or output interfaces to receive and/or transmit any required types of information for access point 130. For example, in the FIG. 2 embodiment, access point 130 may utilize AP I/O interfaces 224 to bi-directionally communicate with any desired type of external entities to receive or send electronic information by utilizing any appropriate and effective techniques.

In the FIG. 2 embodiment, access point 130 may utilize AP display 216 for displaying any desired type of information by utilizing any effective type of display technologies. In the FIG. 2 embodiment, AP transceiver 214 may include any appropriate means for bi-directionally transferring (transmitting and/or receiving) electronic information between access point 130 and other devices by utilizing wireless communication techniques. For example, access point 130 may utilize AP transceiver 214 to transmit any desired type of access-point beacon signals to mobile devices 114, as discussed above in conjunction with FIG. 1A.

In the FIG. 2 embodiment, AP transceiver 214 may generate certain types of enhanced access-point beacon signals that include an enhanced acquisition code that a mobile device 114 may then analyze to identify a particular access point 130, and to evaluate signal quality characteristics for that particular access point 130. The signal quality characteristics may include, but are not limited to signal strength characteristics. Additional details regarding the implementation and utilization of access point 130 are further discussed below in conjunction with FIGS. 3-9B.

Figure 3:
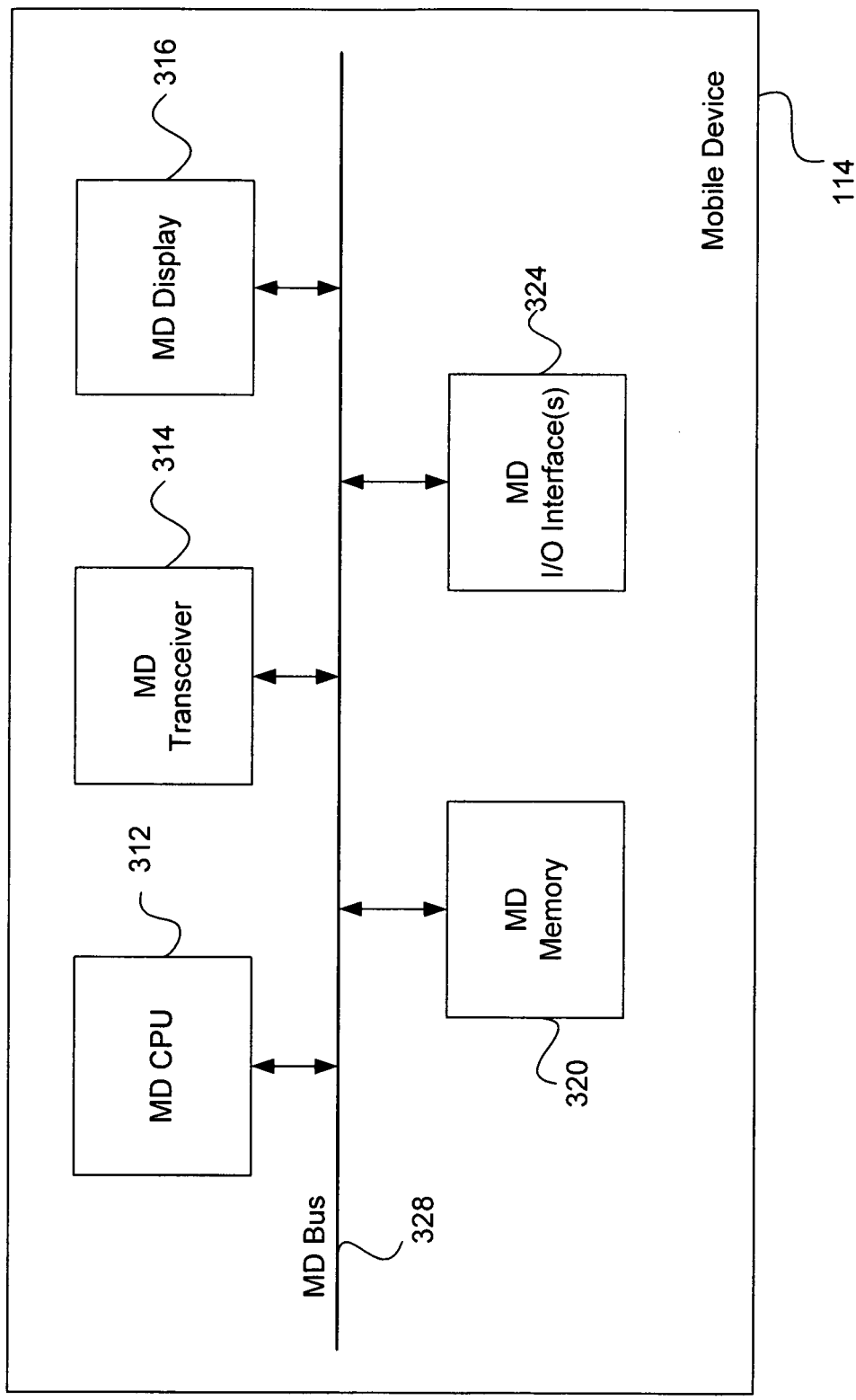
FIG. 3 is a block diagram for one embodiment of a mobile device of FIG. 1A, in accordance with the present invention.

Referring now to FIG. 3, a block diagram for one embodiment of a FIG. 1A mobile device 114 is shown, in accordance with the present invention. In the FIG. 3 embodiment, mobile device 114 may include, but is not limited to, an MD central processing unit (CPU) 312, an MD transceiver 314, an MD display 316, an MD memory 320, and one or more MD input/output interfaces (I/O interfaces) 324. Selected ones of the foregoing components of mobile device 114 may be coupled to, and communicate through, an MD bus 328. In alternate embodiments, mobile device 114 may be implemented using components and configurations in addition to, or instead of, certain of those components and configurations discussed in conjunction with the FIG. 3 embodiment.

In the FIG. 3 embodiment, MD CPU 312 may be implemented to include any appropriate and compatible microprocessor device that preferably executes software instructions to thereby control and manage the operation of mobile device 114. In the FIG. 3 embodiment, MD memory 320 may be implemented to include any combination of desired storage devices, including, but not limited to, read-only memory (ROM), random-access memory (RAM), and various types of non-volatile memory, such as floppy disks, flash memory, or hard disks. Additional details regarding the implementation and utilization of MD memory 320 are further discussed below in conjunction with FIG. 4.

In the FIG. 3 embodiment, MD I/O interfaces 324 may preferably include one or more input and/or output interfaces to receive and/or transmit any required types of information for mobile device 114. For example, in the FIG. 3 embodiment, mobile device 114 may utilize MD I/O interfaces 324 to bi-directionally communicate with any desired type of external entities to receive or send electronic information by utilizing any appropriate and effective techniques. In the FIG. 3 embodiment, mobile device 114 may utilize MD display 316 for displaying any desired type of information by utilizing any effective type of display technologies.

In the FIG. 3 embodiment, MD transceiver 314 may include any appropriate means for bi-directionally transferring (transmitting and/or receiving) electronic information between mobile device 114 and other devices by utilizing wireless communication techniques. In certain embodiments, MD transceiver 314 may include, but is not limited to, a satellite transceiver for communicating with satellites 118, a base station transceiver for communicating with base stations 126, an access-point transceiver for communicating with access points 130, and a mobile device transceiver for communicating with peer mobile devices 114. Additional details regarding the implementation and utilization of mobile device 114 are further discussed below in conjunction with FIGS. 4-9B.

Figure 4:
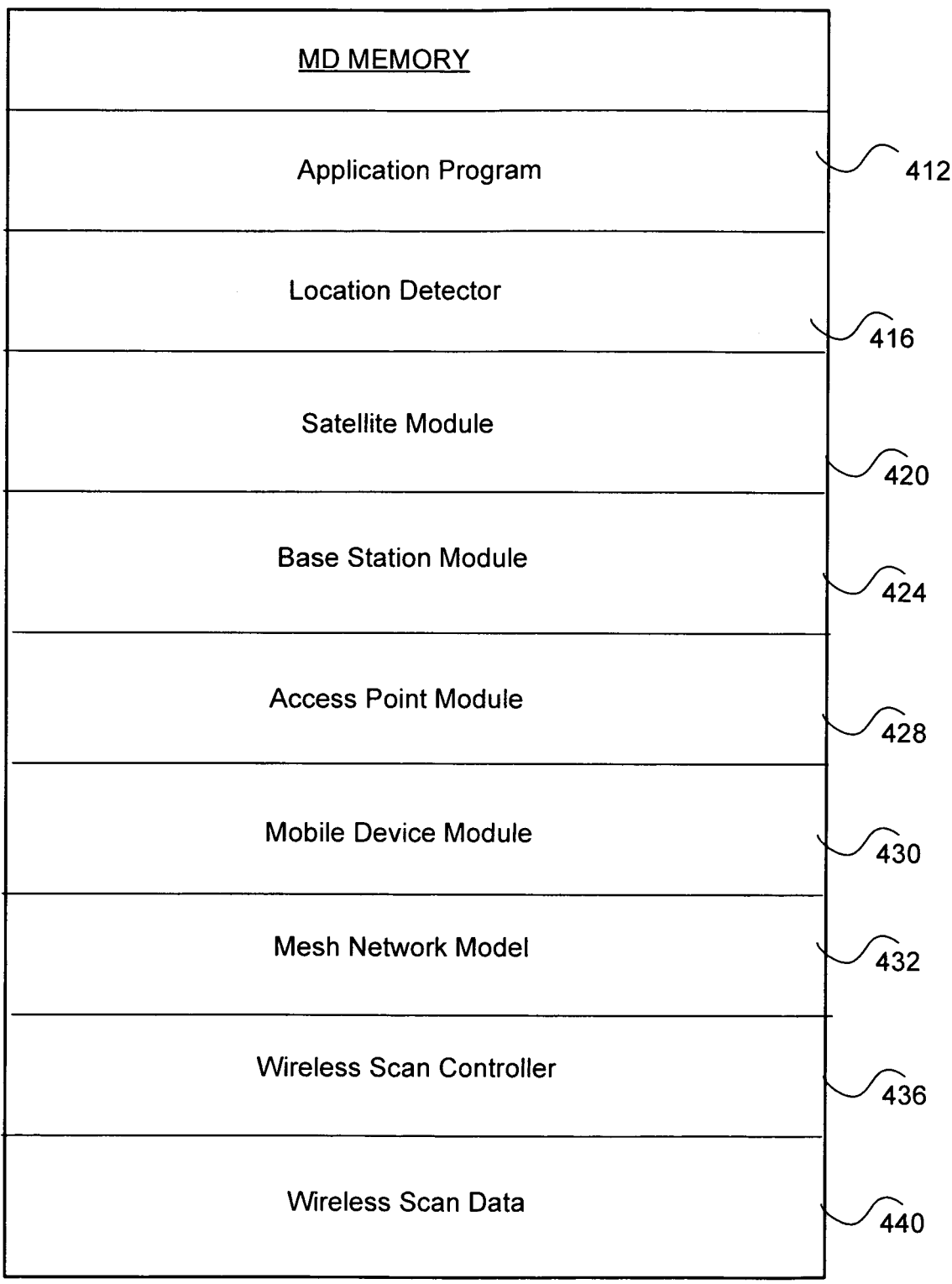
FIG. 4 is a block diagram for one embodiment of the MD memory of FIG. 3, in accordance with the present invention.

Referring now to FIG. 4, a block diagram for one embodiment of the FIG. 3 MD memory 320 is shown, in accordance with the present invention. In the FIG. 4 embodiment, MD memory 320 includes, but is not limited to, an application program 412, a location detector 416, a satellite module 420, a base station module 424, an access point module 428, a mesh network model 432, a wireless scan controller 436, and wireless scan data 440. In alternate embodiments, MD memory 320 may include components and functionalities in addition to, or instead of, certain of those components and functionalities discussed in conjunction with the FIG. 4 embodiment.

In the FIG. 4 embodiment, application program 412 may include program instructions that are preferably executed by MD CPU 312 (FIG. 3) to perform various functions and operations for mobile device 114. The particular nature and functionality of application program 412 typically varies depending upon factors such as the specific type and particular functionality of the corresponding mobile device 114.

In the FIG. 4 embodiment, location detector 412 may be utilized to coordinate and manage enhanced mobile-device location procedures to determine a current physical location of a mobile device 114 by utilizing any effective techniques. For example, in certain embodiments, location detector 412 may utilize information in mesh network model 432 to perform device location procedures. In certain embodiments, location server 126 (FIG. 1A) may also have a software module similar to location detector 412 to remotely perform certain required processing functions.

In the FIG. 4 embodiment, satellite module 424 may be utilized to manage communications with satellites 118 (FIG. 1A), and base station module 424 may be utilized to manage communications with base stations 122 (FIG. 1A). Similarly, access point module 428 may be utilized to manage communications with access points 130 (FIG. 1A), and mobile device module 430 may be utilized to manage communications with peer mobile devices 114 (FIG. 1B).

In the FIG. 4 embodiment, a wireless scan controller 436 automatically performs mobile device scanning procedures to measure relevant characteristics of transmissions from one or more peer mobile devices 114. Wireless scan controller 436 then stores any collected information as wireless scan data 440. In the FIG. 4 embodiment, wireless scan data 440 may include any types of measurements, data, or other information relating to respective ones of the peer mobile devices 114 (FIG. 1B). Examples of such information include, but are not limited to, presence/availability of access-point beacon signals, signal strengths, signal-to-noise values, signal quality characteristics, signal delays, and actual known location coordinates, etc.

In the FIG. 4 embodiment, the location detector 416, wireless scan controller 436, and the various modules 420, 424, 428, and 430 are disclosed and discussed as being implemented as software. However, in alternate embodiments, some or all of these functions may be performed by appropriate electronic hardware circuits that are configured for performing various functions that are equivalent to those functions of the software modules discussed herein. The implementation and utilization of wireless scan controller 436 are further discussed below in conjunction with FIGS. 5-9B.

Figure 5:
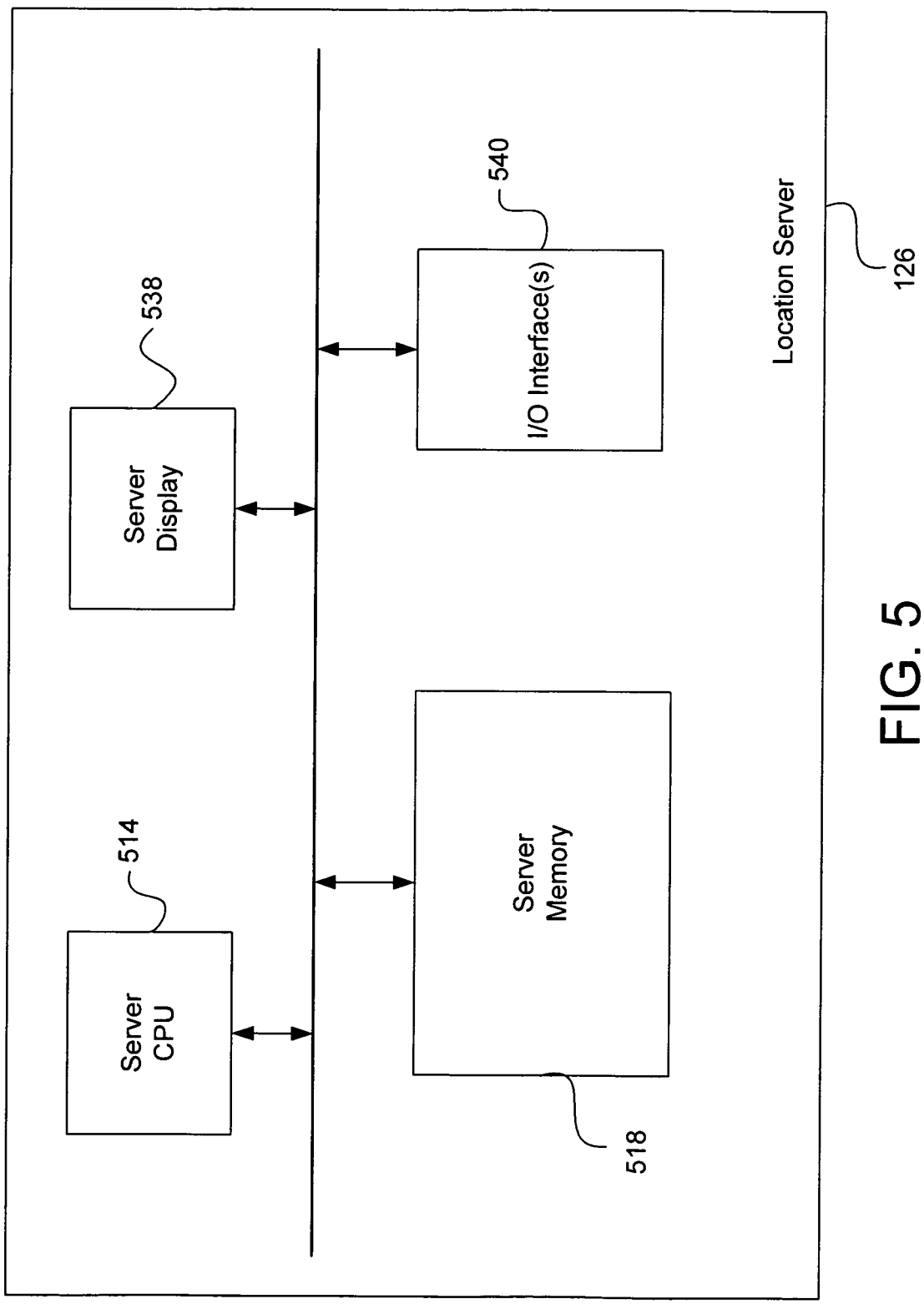
FIG. 5 is one embodiment for one embodiment of the location server of FIG. 1A, in accordance with the present invention.

Referring now to FIG. 5, a block diagram for the FIG. 1A location server 126 is shown, in accordance with one embodiment of the present invention. In the FIG. 5 embodiment, location server 126 includes, but is not limited to, a server CPU 514, a server memory 518, a server display 538, and I/O interface(s) 540. In alternate embodiments, location server 126 may be implemented using components and configurations in addition to, or instead of, certain of those components and configurations discussed in conjunction with the FIG. 5 embodiment.

In the FIG. 5 embodiment, server CPU 514 may be implemented to include any appropriate and compatible microprocessor device that preferably executes software instructions to thereby control and manage the operation of location server 126. In the FIG. 5 embodiment, server memory 518 may be implemented to include any combination of desired storage devices, including, but not limited to, read-only memory (ROM), random-access memory (RAM), and various types of non-volatile memory, such as floppy disks, flash memory, or hard disks. Additional details regarding the implementation and utilization of server memory 518 are further discussed below in conjunction with FIG. 6.

In the FIG. 5 embodiment, I/O interfaces 540 may preferably include one or more input and/or output interfaces to receive and/or transmit any required types of information for location server 126. For example, in the FIG. 5 embodiment, location server 126 may utilize I/O interfaces 540 to bi-directionally communicate with any desired type of external entities to receive or send electronic information by utilizing any appropriate and effective techniques. In the FIG. 5 embodiment, location server 126 may utilize server display 538 for displaying any desired type of information by utilizing any effective type of display technologies. Additional details regarding the implementation and utilization of location server 126 are further discussed below in conjunction with FIGS. 6-9B.

Figure 6:
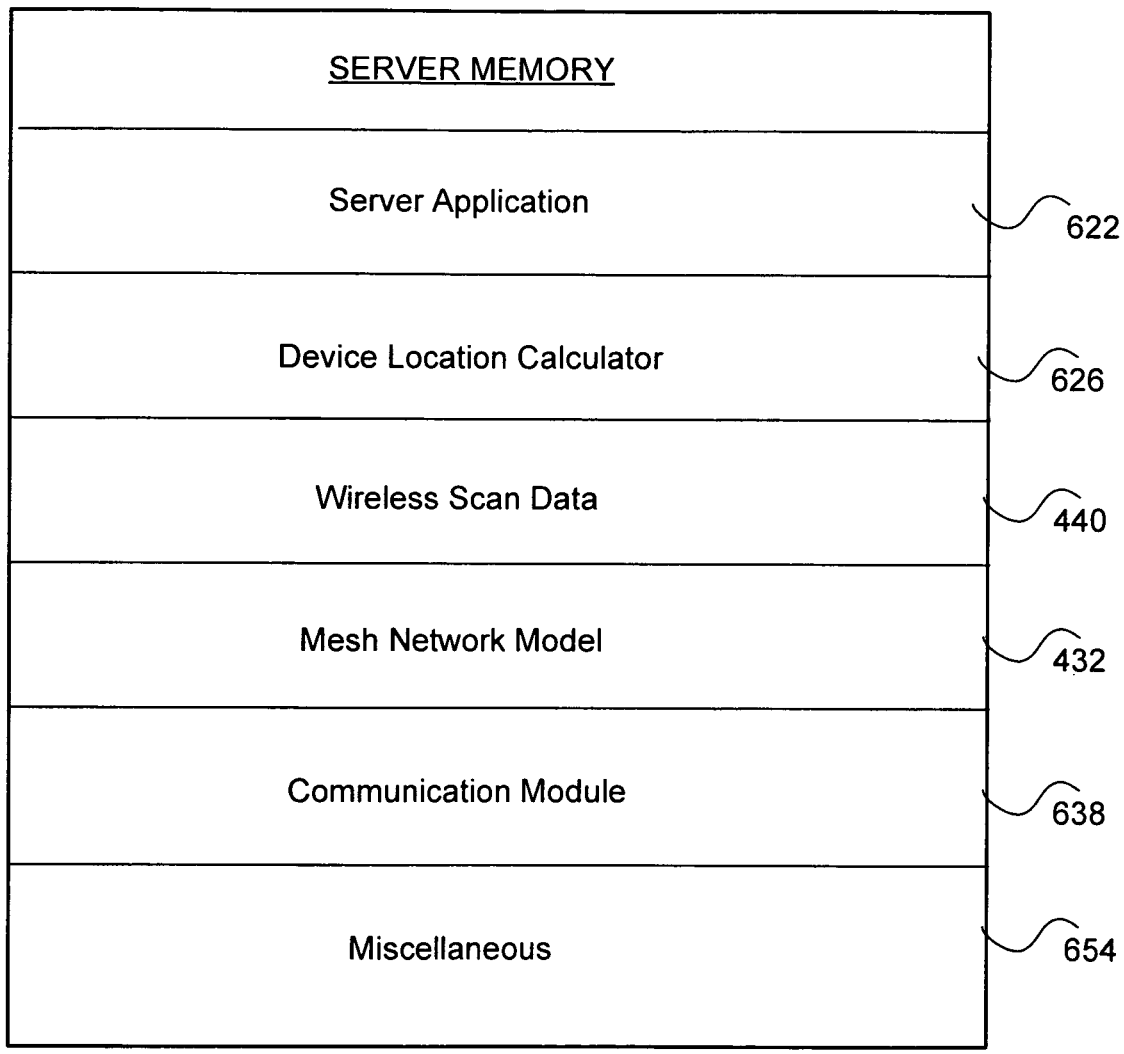
FIG. 6 is a block diagram for one embodiment of the server memory of FIG. 5, in accordance with the present invention.

Referring now to FIG. 6, a block diagram for one embodiment of the FIG. 5 server memory 518 is shown, in accordance with the present invention. In the FIG. 5 embodiment, server memory 518 includes, but is not limited to, a server application 622, a device location calculator 626, wireless scan data 440, a mesh network model 432, a communication module 638, and miscellaneous information 654. In alternate embodiments, server memory 518 may include components and functionalities in addition to, or instead of, certain of those components and functionalities discussed in conjunction with the FIG. 6 embodiment.

In the FIG. 6 embodiment, server application 622 may include program instructions that are preferably executed by server CPU 514 (FIG. 5) to perform various functions and operations for location server 126. The particular nature and functionality of server application 622 typically varies depending upon factors such as the specific type and particular functionality of the corresponding location server 126.

In the FIG. 6 embodiment, location server 126 uses device location calculator 626 to analyze appropriate information from wireless scan data 440 to determine specific locations for one or more mobile devices 114 and/or access points 130 (FIG. 1A) in any effective manner. For example, device location calculator 626 may utilize wireless scan data 440 to calculate location coordinates for a given mobile device 114 or access point 130 by performing basic triangulation calculations, as discussed below in conjunction with FIG. 8. In other embodiments, more complex calculation techniques may be utilized to build statistical models that represent the location of one or more mobile devices 114 and/or access points 130 by utilizing a greater number of scan measurements from mobile devices 114.

In the FIG. 6 embodiment, device location calculator 626 may populate and update mesh network model 432 with newly calculated locations for one or more mobile devices 114 and/or access points 130. One embodiment for mesh network model 432 is further discussed below in conjunction with FIG. 7. Location server 126 may utilize communication module 638 to conduct bi-directional communications with any external entity, including but not limited to, mobile devices 114. Miscellaneous information 654 may include any other information or data for use by location server 126. The utilization of location server 126 is further discussed below in conjunction with FIGS. 7-9B.

Figure 7:
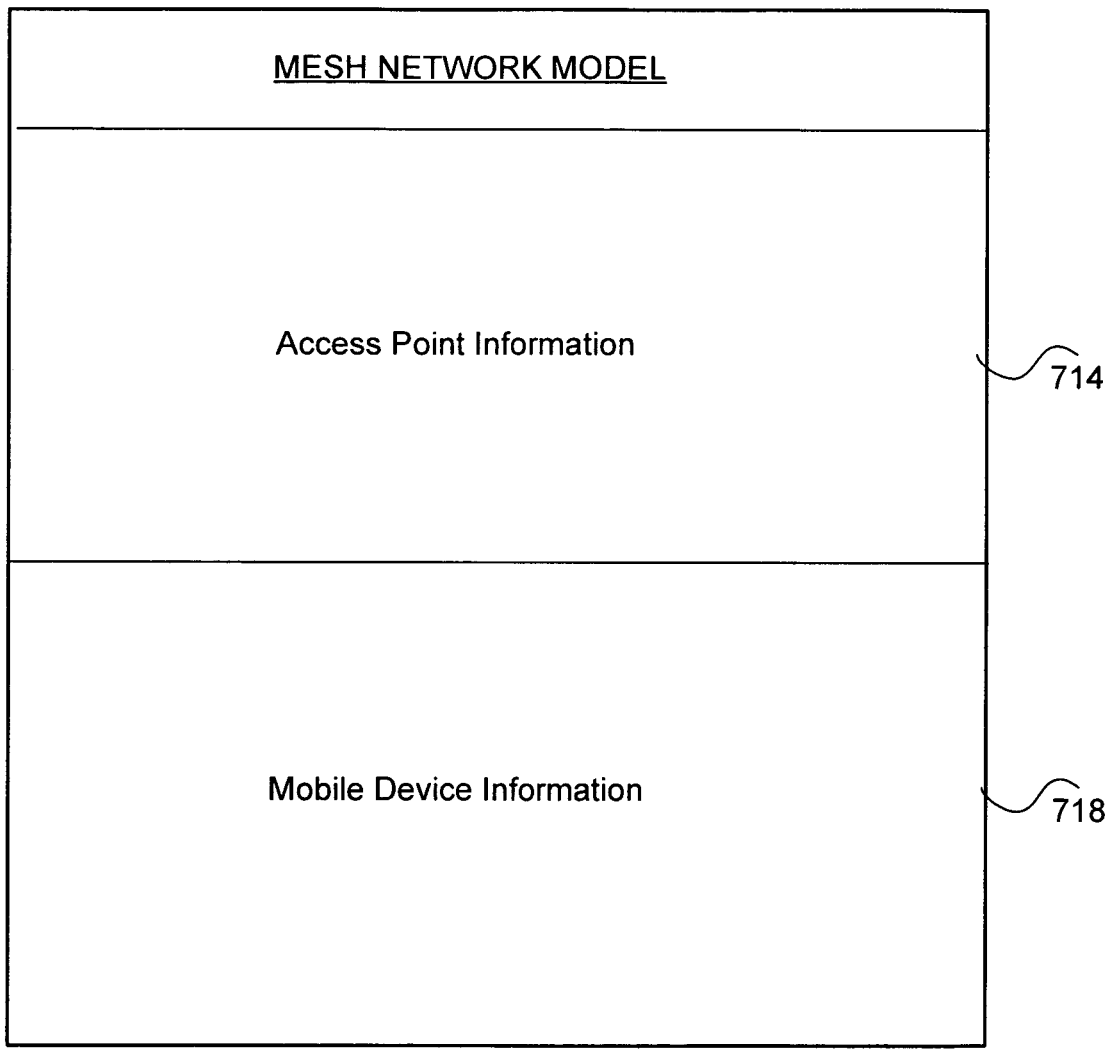
FIG. 7 is a block diagram for one embodiment of the mesh network model of FIGS. 4 and 6, in accordance with the present invention.

Referring now to FIG. 7, a block diagram for one embodiment of the mesh network model 432 of FIGS. 4 and 6 is shown, in accordance with the present invention. The FIG. 7 embodiment is presented for purposes of illustration, and in alternate embodiments, mesh network model 432 may include components and functionalities in addition to, or instead of, certain of those components and functionalities discussed in conjunction with the FIG. 7 embodiment.

In the FIG. 7 embodiment, mesh network model 432 includes, but is not limited to, access point information 714 and mobile device information 718. In the FIG. 7 embodiment, access point information 714 includes, but is not limited to, a series of entries that each corresponds to a different access point 130 in the electronic network. In the FIG. 7 embodiment, each entry includes, but is not limited to, an AP identifier that specifically identifies a corresponding one of the access points 130. Each AP identifier is associated with corresponding AP coordinates that indicate a physical location for the particular access point 130. The AP coordinates may include any desired location information, including but not limited to, a device latitude, a device longitude, and a device altitude.

In the FIG. 7 embodiment, mobile device information 718 includes, but is not limited to, a series of entries that each corresponds to a different mobile device 114 in the electronic network. In the FIG. 7 embodiment, each entry includes, but is not limited to, an MD identifier that specifically identifies a corresponding one of the mobile devices 114. Each MD identifier is associated with corresponding MD coordinates that indicate a physical location for the particular mobile device 114. The MD coordinates may include any desired location information, including but not limited to, a device latitude, a device longitude, and a device altitude. The population of mesh network model 432 is further discussed below in conjunction with FIGS. 8-9B.

Figure 8:
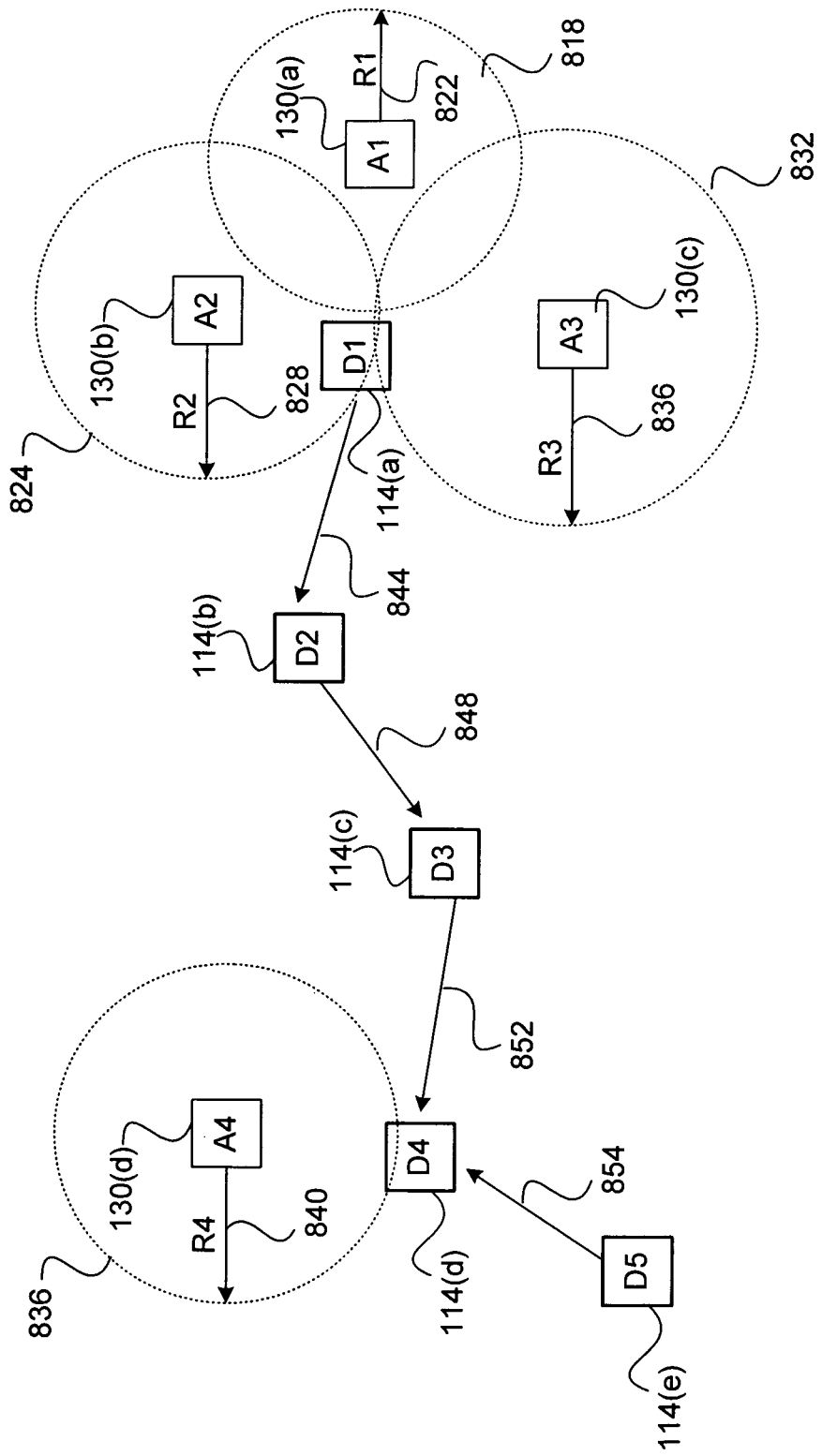
FIG. 8 is a diagram illustrating a device location procedure, in accordance with one embodiment of the present invention.

Referring now to FIG. 8, a diagram illustrating a device location procedure is shown, in accordance with one embodiment of the present invention. The FIG. 8 embodiment is presented for purposes of illustration, and in alternate embodiments, locating mobile devices 114 and/or access points 130 may include techniques and functionalities in addition to, or instead of, certain of those techniques and functionalities discussed in conjunction with the FIG. 8 embodiment.

In the FIG. 8 example, a new access point A4 130(*d*) has been recently added, but is not yet represented in a mesh network model 432 (FIG. 4). The present invention advantageously utilizes wireless functionality of the mobile devices 114 to scan or otherwise communicate with one or more peer mobile devices 114 whose location is known. The resultant wireless scan data 440 may then be utilized to gradually populate or update the mesh network model 432 to represent the corresponding electronic network.

In the FIG. 8 example, a sequential device location procedure may be performed to sequentially locate a series of intervening peer mobile devices D2 114(*b*) and D3 114(*c*) between a subject mobile device D4 114(*d*) (whose location must be discovered) and a target mobile device D1 114(*a*) (for which a specific physical location is known). Once the location of mobile device D4 114(*d*) is known, D4 114(*d*) and other nearby known mobile devices (such as D5 114(*e*)) may be utilized to accurately locate new access point A4 130(*d*). In certain embodiments, the mobile devices 114 may automatically transmit the wireless scan data 440 to location server 126 or another appropriate entity for populating and updating the mesh network model 432.

In the FIG. 8 example, the location of mobile device D1 114(*a*) can be accurately defined. Three access points 130 (A1 130(*a*), A2 130(*b*), and A3 130(*c*)) whose locations are known by utilizing any effective means, are already defined in the mesh network model 432, and are located within wireless scanning range of mobile device D1 114(*a*). In the FIG. 8 embodiment, device 114(*a*) scans for, and detects, access point signals from access points 130(*a*), 130(*b*), and 130(*c*). In the FIG. 8 embodiment, device 114(*a*) then records an AP identifier and a signal strength for each of scanned access points 130 as wireless scan data 440.

Mobile device 114(*a*) may then evaluate the signal strength from the measured wireless scan data 440 to identify a location circle 818 with a radius R1 822 that represents the distance from device 114(*a*) to the scanned access point 130(*a*). Similarly, mobile device 114(*a*) may evaluate the signal strength from the wireless scan data 440 to create a location circle 824 with a radius R2 828 that represents the distance from device 114(*a*) to access point 130(*b*). In addition, mobile device 114(*a*) may evaluate the signal strength from the wireless scan data 440 to create a location circle 832 with a radius R3 836 that represents the distance from device 114(*a*) to access point 130(*c*). In the FIG. 8 example, the location of mobile device D1 114(*a*) may be defined as the point at which all three location circles 818, 824, and 832 intersect, or as the only point that may be triangulated by utilizing the three radius vectors 822, 824, and 836. Once the specific coordinates of D1 114(*a*) are known, that location information may be utilized to update the mesh network model 432.

In accordance with the sequential device location procedure mentioned above, the location of mobile device D2 114(*b*) may next be estimated with reference to the known location of mobile device D1 114(*a*). In practice, D2 114(*b*) is within range of wireless transmissions from D1 114(*a*) along signal path 844. D2 114(*b*) may thus utilize the known location of D1 114(*a*) (potentially in conjunction with any other known devices that are within wireless transmission range) to calculate estimated location coordinates for D2 114(*b*).

Similarly, the location of mobile device D3 114(*c*) may be estimated with reference to the estimated location of mobile device D2 114(*b*). In practice, D3 114(*c*) is within range of wireless transmissions from D2 114(*b*) along signal path 848.

D3 114(c) may thus utilize the estimated location of D2 114(b) (potentially in conjunction with any other known devices that are within wireless transmission range) to calculate estimated location coordinates for D3 114(c).

Finally, the location of mobile device D4 114(d) may be estimated with reference to the estimated location of mobile device D3 114(c). In practice, D4 114(d) is within range of wireless transmissions from D3 114(c) along signal path 852. D4 114(d) may thus utilize the estimated location of D3 114(c) (in conjunction with known mobile device D5 114(e) and any other known devices that are within wireless transmission range) to calculate estimated location coordinates for D4 114(d).

In accordance with the present invention, the locations of mobile devices D1 114(a), D2 114(b), D3 114(c), and D4 114(d) that are derived from the sequential device location procedure may be transmitted to location server 126 (FIG. 1) to be added to the mesh network model 432. In addition, once the location of D4 114(d) has been estimated, then the location of new access point A4 130(d) may be estimated because device D4 114(d) is within transmission range of access point A4 130(d), as shown by transmission circle 836 and radius vector R4 840. In certain situations, the location coordinates of access point A4 114(d) may be further refined by utilizing any additional known devices (not shown) that are within transmission range.

In certain embodiments, mobile device D4 114(d) may transmit wireless scan data 440 corresponding to access point A4 130(d) to location server 126 for estimating the location of access point A4 130(d). After, the location coordinates of access point A4 130(d) have been estimated, this new location information may be added to mesh network model 432 to more accurately represent the electronic network. In accordance with the present invention, the mobile devices 114 may perform continuous or periodic scanning procedures to dynamically update or further populate the mesh network model 432 based on recent alterations in the device locations of access points 130, mobile devices 114, or any other appropriate entities. Additional techniques for populating the mesh network model 432 are discussed below in conjunction with FIG. 9.

Figure 9A:
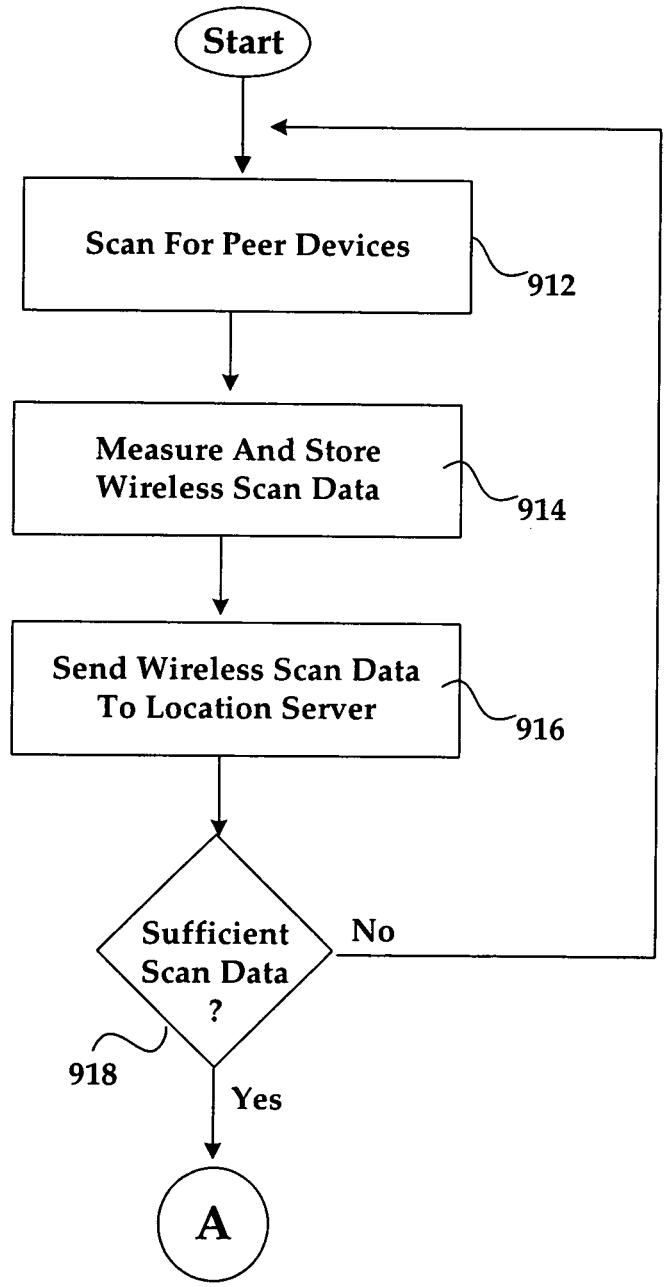
FIGS. 9A-9B present a flowchart of method steps for effectively utilizing a mesh network model, in accordance with one embodiment of the present invention.
Figure 9B:
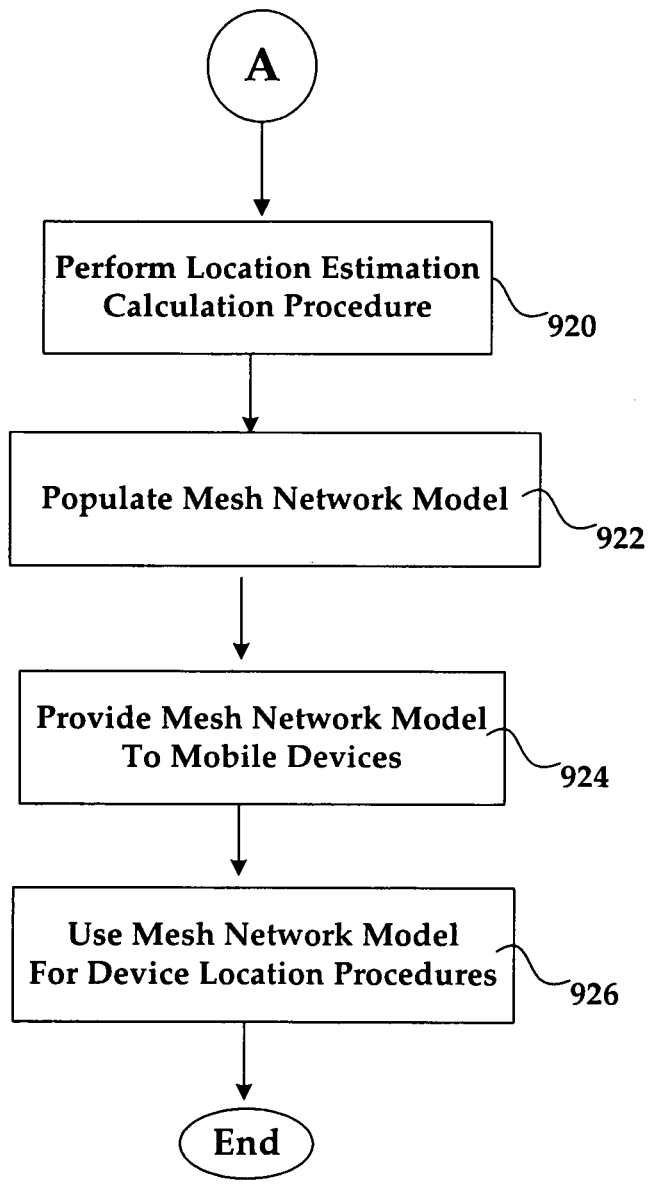

Referring now to FIGS. 9A-9B, a flowchart of method steps for efficiently creating and utilizing a mesh network model 432 is shown, in accordance with one embodiment of the present invention. The example of FIGS. 9A-9B is presented for purposes of illustration, and in alternate embodiments, the present invention may utilize steps and sequences other than those step and sequences discussed in conjunction with the embodiment of FIGS. 9A-9B.

In the FIG. 9A embodiment, in step 912, one or more mobile devices 114 in an electronic network perform a wireless scanning procedure by utilizing any effective techniques to detect transmission signals from other peer mobile devices 114 or other appropriate entities in the electronic network. In step 914, the mobile device(s) 114 measure and store wireless scan data 440 corresponding to the wireless scanning procedure. The wireless scan data 440 may include any appropriate information including, but not limited to, device identifiers and signal strengths for the respective scanned peer devices 114.

In step 916, the mobile device(s) 114 send the captured wireless scan data 440 to a location server 126 by utilizing any effective transmission techniques. In step 918, a device location calculator 626 of the location server 126 utilizes predefined threshold criteria to determine whether sufficient wireless scan data 440 exists for successfully performing a location estimation calculation procedure to determine location coordinates for one or more entities in the electronic network. If sufficient wireless scan data 440 has been collected, then the FIG. 9A process advances to step 920 of FIG. 9B through connecting letter "A."

In step 920, the device location calculator 626 of the location server 126 analyzes the wireless scan data 440 to perform the location estimation calculation procedure to determine location coordinates for one or more entities in the electronic network. In the FIG. 9B embodiment, device location calculator 626 may perform the location estimation calculation procedure by utilizing any effective calculation or estimation techniques. For example, device location calculator 626 may utilize various known or enhanced triangulation techniques to estimate the locations of appropriate network entities. Alternately, device location calculator 626 may utilize various known or enhanced probabilistic relaxation techniques to estimate the locations of appropriate network entities. In addition, the locations of certain network entities may be directly measured or are already known.

Further details regarding the foregoing probabilistic relaxation techniques may be found in the following four references which are hereby incorporated by reference. 1). S. Geman and D. Geman, "Stochastic relaxation, Gibbs distributions, and the Bayesian restoration of images," *IEEE Trans. Pattern Analysis and Machine Intelligence,* vol. 6, pp. 721-741, 1984, 2). R. A. Hummel and S. W. Zucker, "On the foundations of relaxation labeling process," *IEEE Trans. Pattern Analysis and Machine Intelligence,* vol. 5, no. 3, pp. 267-286, May 1983, 3). J. Kittler and E. R. Hancock, "Combining evidence in probabilistic relaxation," *Int'l J. Pattern Recognition and Artificial Intelligence,* vol. 3, pp. 29-51, 1989, 4). J. Pearl. Probabilistic Reasoning in Intelligent Systems. Networks of Plausible Inference. Morgan Kaufmann, 1988.

In step 922, device location calculator 626 utilizes the estimated location coordinates from the location estimation calculation procedure, along with any measured or known location coordinates, to populate or update the mesh network model 432. In step 924, location server 126 may then provide the mesh network model 432 to the mobile devices 114 by utilizing any appropriate and effective communication techniques. Finally, in step 926, the mobile devices 114 may advantageously utilize the mesh network model 432 to effectively perform any desired device location procedures. For at least the foregoing reasons, the present invention thus provides an improved system and method for effectively populating a mesh network model.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for populating a mesh network model, comprising:
   a plurality of peer devices configured to transmit peer device signals by utilizing a wireless broadcasting procedure, wherein said plurality of peer devices includes wireless access points; and
   a plurality of mobile devices configured to wirelessly detect said peer device signals to produce wireless scan data corresponding to each of said plurality of peer devices, wherein said mesh network model is populated with location coordinates of said plurality of peer devices and said plurality of mobile devices by analyzing said wireless scan data, and wherein a first mobile device of said plurality of mobile devices utilizes said mesh network model to locate said first mobile device with reference to said location coordinates of said plurality of peer devices from said mesh network model, wherein said first mobile device is located based on location of an intervening mobile device along a signal path between said first mobile device and a second mobile device of said plurality of mobile devices, wherein location of said second mobile device is known.

2. The system of claim 1, further comprising:
a location server configured to receive said wireless scan data, said location server performing a location estimation calculation procedure based on said wireless scan data to determine said location coordinates for populating said mesh network model.

3. The system of claim 2, wherein said mesh network model is provided by said location server to said plurality of mobile devices and said plurality of peer devices to perform device location procedures with reference to said location coordinates from said mesh network model.

4. The system of claim 1, wherein network entities from said mesh network model include said plurality of mobile devices, said plurality of peer devices, and said wireless access points.

5. The system of claim 1, wherein a sequential device location procedure is performed to sequentially locate a series of intervening mobile devices between said first mobile device with an unknown location and said second mobile device with a known location, said sequential device location procedure sequentially determining respective device locations of said intervening mobile devices proceeding from said first mobile device to said second mobile device until said second mobile device is located.

6. The system of claim 1, wherein said plurality of mobile devices and said plurality of peer devices are one or more of: a laptop computer device, a personal digital assistant, or a cellular telephone.

7. The system of claim 1, wherein said wireless scan data comprises device identifiers and signal strengths for said plurality of peer devices.

8. The system of claim 1, wherein said plurality of mobile devices automatically captures said wireless scan data without assistance from device users.

9. The system of claim 1, further comprising a location server configured to perform a location estimation calculation procedure by performing triangulation procedures based on said wireless scan data.

10. The system of claim 1, further comprising a location server configured to perform a location estimation calculation procedure by utilizing probabilistic relaxation techniques based on said wireless scan data.

11. The system of claim 1, wherein said mesh network model comprises mobile device location information for said plurality of mobile devices, peer device location information for said plurality of peer devices, and access point location information for said wireless access points.

12. The system of claim 1, wherein said plurality of mobile devices automatically and continuously scan said peer device signals to produce and store said wireless scan data.

13. The system of claim 12, wherein said wireless scan data comprises signal detection indicators for respective ones of said peer device signals, signal strengths of said peer device signals, signal-to-noise values of said peer devices signals, signal quality characteristics of said peer device signals, signal delays of said peer device signals, and said location coordinates of said plurality of peer devices.

14. The system of claim 1, wherein said plurality of mobile devices transmits said wireless scan data to a location server by utilizing wireless transmission techniques.

15. The system of claim 14, wherein said location server determines that an amount of said wireless scan data received from said plurality of mobile device exceeds a threshold value before performing a location estimation calculation procedure.

16. The system of claim 14, wherein said location server populates or updates said mesh network model based upon said location coordinates calculated from said wireless scan data.

17. The system of claim 16, wherein said location server sends updated versions of said mesh network model to said plurality of mobile devices.

18. The system of claim 17, wherein said plurality of mobile devices and said plurality of peer devices utilize said updated versions of said mesh network model for performing device location procedures.

19. The system of claim 1, wherein said plurality of mobile devices, said plurality of peer devices, and a location server communicate on a continuous basis to populate and update said mesh network model.

20. The system of claim 1, wherein said plurality of mobile devices performs a wireless scanning procedure to collect said peer device signals for determining a current location for a newly-installed or relocated one of said wireless access points.

21. The system of claim 1, wherein said second mobile device is not within a transmission range of an unlocated wireless access point and said first mobile device is within said transmission range, wherein said first mobile device performs a wireless scanning procedure after being located to collect said peer device signals from said unlocated wireless access point, wherein a location server determines a current location for said unlocated wireless access point.

22. A method for populating a mesh network model, comprising:
transmitting peer device signals from a plurality of peer devices by utilizing a wireless broadcasting procedure, wherein said plurality of peer devices includes wireless access points;
utilizing a plurality of mobile devices for wirelessly detecting said peer device signals to produce wireless scan data corresponding to each of said plurality of peer devices; and
populating said mesh network model with location coordinates of said plurality of peer devices and said plurality of mobile devices by analyzing said wireless scan data, wherein a first mobile device of said plurality of mobile devices utilizes said mesh network model to locate said first mobile device with reference to said location coordinates of said plurality of peer devices from said mesh network model, wherein said first mobile device is located based on location of an intervening mobile device along a signal path between said first mobile device and a second mobile device of said plurality of mobile devices, wherein location of said second mobile device is known.

* * * * *